J. C. SMITH.
PACKLESS ANTIDRIP VALVE.
APPLICATION FILED AUG. 30, 1917.
1,274,949.
Patented Aug. 6, 1918.
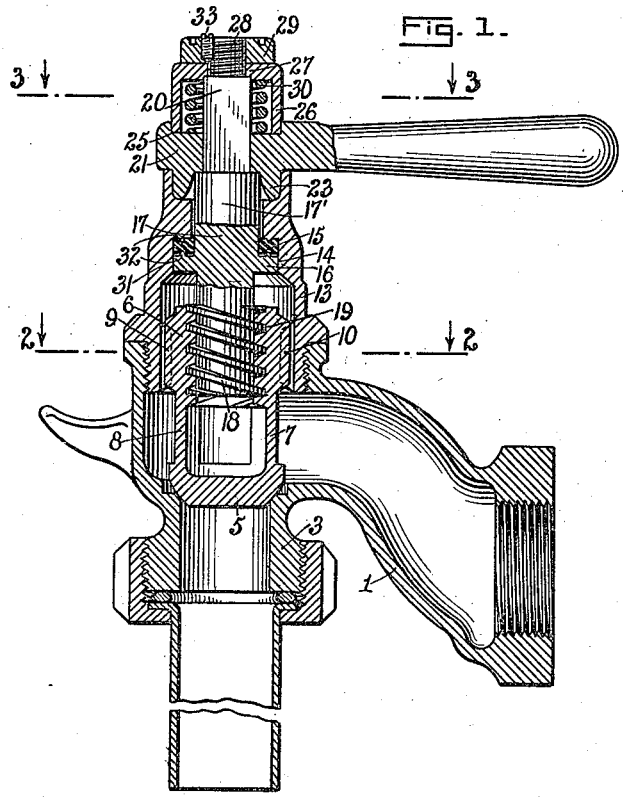
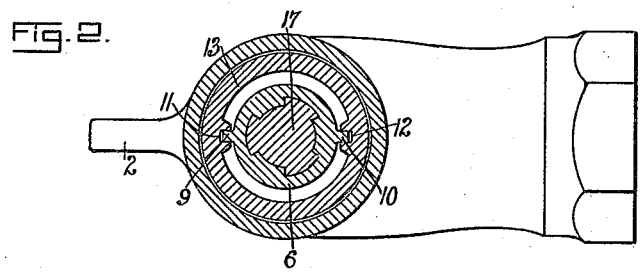
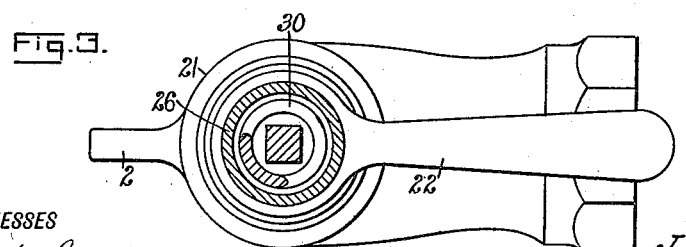
WITNESSES
INVENTOR
J.C.Smith
BY
ATTORNEYS

UNITED STATES PATENT OFFICE.

JAMES C. SMITH, OF PATERSON, NEW JERSEY.

PACKLESS ANTIDRIP-VALVE.

1,274,949.  Specification of Letters Patent.  Patented Aug. 6, 1918.

Application filed August 30, 1917. Serial No. 188,989.

*To all whom it may concern:*

Be it known that I, JAMES C. SMITH, a citizen of the United States, and a resident of Paterson, in the county of Passaic and State of New Jersey, have invented a new and Improved Packless Antidrip-Valve, of which the following is a full, clear, and exact description.

This invention relates to valve mechanisms and particularly to an improved valve which may be quickly and easily operated and which dispenses with the usual packing necessary to make the same leak-proof.

Another object in view is the provision of an improved quick-acting valve provided with a gasket and associated parts for producing a tight connection continually.

An additional object of the invention is to provide a valve with a washer and a spring to give an even tension thereon whereby leakage is prevented during the up and down movement of the valve member when in operation.

In the accompanying drawing:—

Figure 1 is a longitudinal vertical section through a valve disclosing an embodiment of the invention.

Fig. 2 is a transverse sectional view through Fig. 1 on line 2—2.

Fig. 3 is a tranverse sectional view through Fig. 1 on line 3—3.

Referring to the accompanying drawing by numerals, 1 indicates a casing provided with the projection 2 for supporting any desired article, said casing being formed with an outlet member 3 having a seat 4 for receiving the valve member 5.

A sleeve 6, formed integral with the valve member 5, is provided with beads or guides 9 and 10 fitting into the grooves 11 and 12 (Fig. 2), said grooves being provided by the formation of projections on the bonnet, which bonnet may be threaded, bolted or otherwise fastened to the casing 1. The bonnet 13 is provided with a bore or recess 14 into which the upper end of the sleeve 6 extends and which accommodates the gasket 15 and the annular enlargement or collar 16 on the stem, rod or shaft 17. The shaft 17 below the enlargement 16 is provided with threads 18 engaging suitable threads 19 in the sleeve 6 so that when the shaft is rotated the sleeve and valve member 5 will be raised or lowered according to the direction of rotation of the shaft quickly so as to give full opening of the valve member through port in 3.

The upper end of the shaft 17 is round at 17' and then squared at the section of 20, said squared section extending through a squared aperture in the head 21 of the operating handle or wheel 22 so that when the handle or wheel is moved the stem will be moved accordingly. The head 21 is provided with a depending annular flange 23 fitting into the socket 24 in the upper end of the bonnet 13. The upper face of the head 21 is provided with a socket 25 for receiving the lower end of the sleeve 26, said sleeve having a closed end 27 to which the threaded extension 28 of stem 17 projects. Extension 28 accommodates the nut 29 which is preferably screwed down tight against the end 27 so as to draw the upper end of the squared section 20 against said end, thus preventing any downward movement of the shaft 17 though allowing a slight upward movement under the action of spring 30 so that the enlargement 16 may press against the gasket 15 for producing a tight connection.

In order to positively prevent leakage around the stem 17 the enlargement 16 is provided with an annular upstanding sharpened flange 31 projecting into gasket 15, while the bonnet 13 is also provided with a depending annular sharpened flange 32 extending into the gasket 15. By this construction and arrangement a continued tension is provided for maintaining the enlargement 16 against the gasket for producing a tight connection, though a downward pressure exerted on the nut 29 or associated parts will not in any way move the valve members downward.

In order to prevent nut 29 from unfastening from extension 28 of the valve stem, a set screw 33 is placed half way in each member, thereby preventing casing 26 separating from 21 at 25. By this construction and arrangement, a continued and even tension is provided for maintaining a constant pressure of stem collar 16 on washer 15, thereby preventing leakage past the said parts.

What I claim is:

1. In a valve of the character described, a casing, a bonnet connected with the casing, a valve member having a threaded portion, a power shaft fitting in the threaded portion of the valve member so that when the power shaft rotates, the valve member will be moved longitudinally according to the rotation of the power shaft, a manually operated member having a head provided with an opening fitting over the upper part of said power shaft, a depending annular portion fitting in the upper part of the bonnet, a spring surrounding the upper portion of said power shaft and resting on said head, a sleeve having a closed upper end surrounding said spring and arranged so that its bottom will engage said head and the closed upper end will engage said spring, and means for rigidly securing the closed end to the upper part of said power shaft whereby the power shaft may freely rotate and said spring continually act for holding the power shaft in a predetermined position while the sleeve with the closed upper end preventing a downward movement of said power shaft.

2. In a valve of the character described, a casing, a bonnet removably connected with said casing, said bonnet having a socket in the upper part merging into a passageway, a valve member arranged in the casing and extending into the bonnet, a power shaft engaging said valve member and reciprocating the same as said shaft is rotated, said shaft being provided with an enlargement having an annular upstanding flange or bead, a gasket arranged between said enlargement and said bonnet, a spring normally pressing said flange or bead into said gasket, and a shaft operating member arranged between the spring and the bonnet, said operating member having a depending annular flange fitting into the socket in the bonnet.

3. In a valve of the character described, a casing, a bonnet removably connected with the casing, a reciprocating valve member arranged in the bonnet and projecting into the casing, said bonnet having a socket in the upper end, a power shaft extending through the bonnet and engaging the valve member for opening and closing the same, a gasket surrounding said power shaft and engaging an enlargement thereof and the bonnet for producing a tight connection, an operating member having a depending portion fitting into said socket for operating said shaft, a spring resting on said operating member, a sleeve having an upper closed end surrounding said spring and resting against said operating member and against said spring, and a locking member for locking the sleeve to said shaft whereby there is a continued upward tendency created by said spring for compressing said gasket.

4. In a valve of the character described, a casing, a bonnet connected with the casing provided with grooves, a valve member having beads or projections fitting into said grooves whereby the valve member may reciprocate but not rotate, said valve member having a threaded portion, a power shaft fitting in the threaded portion of the valve member so that when the power shaft rotates said valve member will move longitudinally according to the direction of rotation of the power member, said power member being also provided with an enlargement having a sharpened flange or bead, a gasket surrounding said power member and arranged so that said bead will be embedded in one side thereof, a sharpened bead or flange extending from said bonnet and embedded in the other side of said gasket, said power member having a squared upper portion, a manually operated member having a head provided with a square opening fitting on the squared part of said power member and a depending annular portion fitting in the upper part of the bonnet, a spring surrounding said squared portion and resting on said head, a sleeve having a closed upper end surrounding said spring and arranged so that the bottom edge will engage said head and the closed end the upper end of said spring, and a nut for holding the closed end against the squared part of said power member whereby the power member may freely rotate and said spring continually act for holding said beads in engagement with said gasket while the sleeve with the closed upper end prevents a downward movement of said power member.

JAMES C. SMITH.